(12) United States Patent
Yen et al.

(10) Patent No.: US 9,013,708 B2
(45) Date of Patent: Apr. 21, 2015

(54) OPTICAL APPARATUS AND OPERATING METHOD THEREOF

(71) Applicant: Crystalvue Medical Corporation, Gueishan, Taoyuan (TW)

(72) Inventors: Meng-Shin Yen, Taipei (TW); William Wang, Taoyuan (TW); Chung-Cheng Chou, Luzhu Township, Taoyuan County (TW); Chun-Nan Lin, Bade (TW)

(73) Assignee: Crystalvue Medical Corporation, Taoyuan (TW)

( * ) Notice: Subject to any disclaimer, the term of this patent is extended or adjusted under 35 U.S.C. 154(b) by 150 days.

(21) Appl. No.: 13/774,257

(22) Filed: Feb. 22, 2013

(65) Prior Publication Data

US 2013/0222807 A1   Aug. 29, 2013

(30) Foreign Application Priority Data

Feb. 24, 2012   (TW) .............................. 101106377 A
Feb. 22, 2013   (TW) .............................. 102106108 A

(51) Int. Cl.
*G01B 11/02*   (2006.01)
*G01B 9/02*   (2006.01)

(52) U.S. Cl.
CPC .................. *G01B 9/02015* (2013.01)

(58) Field of Classification Search
CPC ........... G01B 9/02015; G01B 9/02048; G01B 9/02049
USPC .......................................................... 356/450
See application file for complete search history.

(56) References Cited

U.S. PATENT DOCUMENTS

| | | | | |
|---|---|---|---|---|
| 5,026,977 A | * | 6/1991 | Hubbard, Jr. ............... | 250/201.9 |
| 2003/0011782 A1 | * | 1/2003 | Tanno ........................... | 356/497 |
| 2010/0165291 A1 | * | 7/2010 | Sugita et al. .................. | 351/206 |

* cited by examiner

*Primary Examiner* — Jonathan Hansen
(74) *Attorney, Agent, or Firm* — Muncy, Geissler, Olds & Lowe, P.C.

(57) ABSTRACT

An optical apparatus includes a light source, an optical coupling module, a reference light reflection module, and a data processing module. The light source provides an incident light. The optical coupling module divides the incident light into a reference light and a detection light emitting to the reference light reflection module and the object respectively. The reference light reflection module reflects the reference light and rapidly change the optical path of the reference light. The optical coupling module receives a first reflected light generated by the reference light reflection module reflecting the reference light and a second reflected light generated by the object reflecting the detection light and it interferes the first reflected light and second reflected light to generate a light interference signal. The data processing module receives and analyzes the light interference signal to obtain an optical detection result related to the object.

4 Claims, 7 Drawing Sheets

OPTICAL APPARATUS AND OPERATING METHOD THEREOF

BACKGROUND OF THE INVENTION

1. Field of the Invention

The invention relates to optical detection, and in particular, to an optical apparatus capable of rapidly changing optical path of the reference light to effectively enhance detection efficiency and an operating method thereof.

2. Description of the Prior Art

In recent years, with the progress of the optical detection technology, the optical image scanning technology provides a non-invasive way to know the structure and the composition of the organizations of the object to be detected. Because it is rapid and non-invasive, it is widely applied to many regions, especially human body function detection and medical diagnostic.

Please refer to FIG. 1. FIG. 1 shows basic structure of the conventional optical interference detection apparatus. As shown in FIG. 1, the conventional optical interference detection apparatus 1 changes the position of the reflection mirror 14 (moving parallel to the z-direction in FIG. 1) to obtain different optical path differences to use Michelson interferometer effect to get the matter characteristics of the object 16 in depth direction (the z-direction in FIG. 1). That is to say, the reflection mirror 14 is used to reflect the reference light, and the optical interference detection apparatus 1 will determine the matter characteristics of the object 16 in depth direction by moving the position of the reflection mirror 14 and performing interference comparison to the detection signal. Therefore, the reflection mirror 14 is usually disposed on a scanning platform capable of moving along the z-direction to rapidly move back and forth.

From above, it can be known that the combination mechanism of the reflection mirror 14 and the scanning platform in the optical interference detection apparatus 1 will directly affect the optical path distance factor in optical interference provided by the reference light, and the detection efficiency of the optical interference detection apparatus 1 will be also affected. However, because the combination mechanism of the reflection mirror 14 and the scanning platform used in the conventional optical interference detection apparatus 1 fails to provide the function of rapidly changing the optical path of the reference light, the detection efficiency of the conventional optical interference detection apparatus 1 is not good enough.

SUMMARY OF THE INVENTION

Therefore, an optical apparatus and an operating method thereof are disclosed in the invention to solve the above-mentioned problems.

An embodiment of the invention is an optical apparatus. In this embodiment, the optical apparatus includes a light source, an optical coupling module, a reference light reflection module, and a data processing module. The light source provides an incident light. The optical coupling module divides the incident light into a reference light and a detection light emitting to the reference light reflection module and the object respectively. The reference light reflection module reflects the reference light and rapidly change the optical path of the reference light. The optical coupling module receives a first reflected light generated by the reference light reflection module reflecting the reference light and a second reflected light generated by the object reflecting the detection light and it interferes the first reflected light and second reflected light to generate a light interference signal. The data processing module receives and analyzes the light interference signal to obtain an optical detection result related to the object.

In an embodiment, the reference light reflection module uses a horizontal moving mechanism or a rotational mechanism to rapidly change the optical path of the reference light.

In an embodiment, if the reference light reflection module uses the horizontal moving mechanism, the reference light reflection module at least includes a reflection unit and a bi-directional reflection light source.

In an embodiment, the reflection unit is designed in a ladder form.

In an embodiment, if the reference light reflection module uses the rotational mechanism, the reference light reflection module at least includes a rotation base, a rotation element, a reflection unit, and a reflection light source, the rotation base itself can horizontally move or rotate and have multiple degrees of freedom.

In an embodiment, if the reference light reflection module is integral rotary designed, and the rotation element is overall designed and the reflection unit is disposed in an isometric position or a non-isometric position.

In an embodiment, if the reference light reflection module is modular rotary designed, and the rotation element is disposed on the rotation base and radially outward, the reflection unit is disposed at a far end of the rotation element, the length of the rotation element is adjustable, and the number of the rotation element disposed on the rotation base is adjustable.

In an embodiment, the reference light reflection module roughly or narrowly adjusts the position of the reflection unit respectively.

Another embodiment of the invention is an optical apparatus operating method. In this embodiment, the optical apparatus includes a light source, an optical coupling module, a reference light reflection module, and a data processing module. The method includes steps of: (a) the light source providing an incident light; (b) the optical coupling module dividing the incident light into a reference light and a detection light, wherein the reference light is emitted to the reference light reflection module and the detection light is emitted to an object to be detected; (c) the reference light reflection module reflecting the reference light and rapidly changing an optical path of the reference light; (d) the optical coupling module receiving a first reflected light generated by the reference light reflection module reflecting the reference light and a second reflected light generated by the object reflecting the detection light and the optical coupling module interfering the first reflected light and the second reflected light to generate a light interference signal; (e) the data processing module receiving and analyzing the light interference signal to obtain an optical detection result related to the object.

Compared with the prior art, the optical apparatus and operating method thereof in the invention enhance the speed of changing the optical path of the reference light by a reference light reflection module using a horizontal moving mechanism or a rotational mechanism to increase the optical detection efficiency of the optical apparatus using non-destructive and non-contact optical interference technology. In addition, if the reference light reflection module is modular rotary designed, the length of the rotation element is adjustable, and the number of the rotation element disposed on the rotation base can be also adjusted based on different detection items and objects to be detected, so that the elastic that the optical device performs optical detection can be effectively enhanced. Moreover, when the optical apparatus of the invention is applied to measure human's axial length, the reference light reflection module can roughly or narrowly adjusts the position of the reflection unit respectively according to the factors of race, age, gender, residence area of the person to be detected, so that the accurate data of the axial length can be rapidly obtained for the medical personnel to do the clinical diagnosis.

The advantage and spirit of the invention may be understood by the following recitations together with the appended drawings.

BRIEF DESCRIPTION OF THE APPENDED DRAWINGS

Figure 4A:
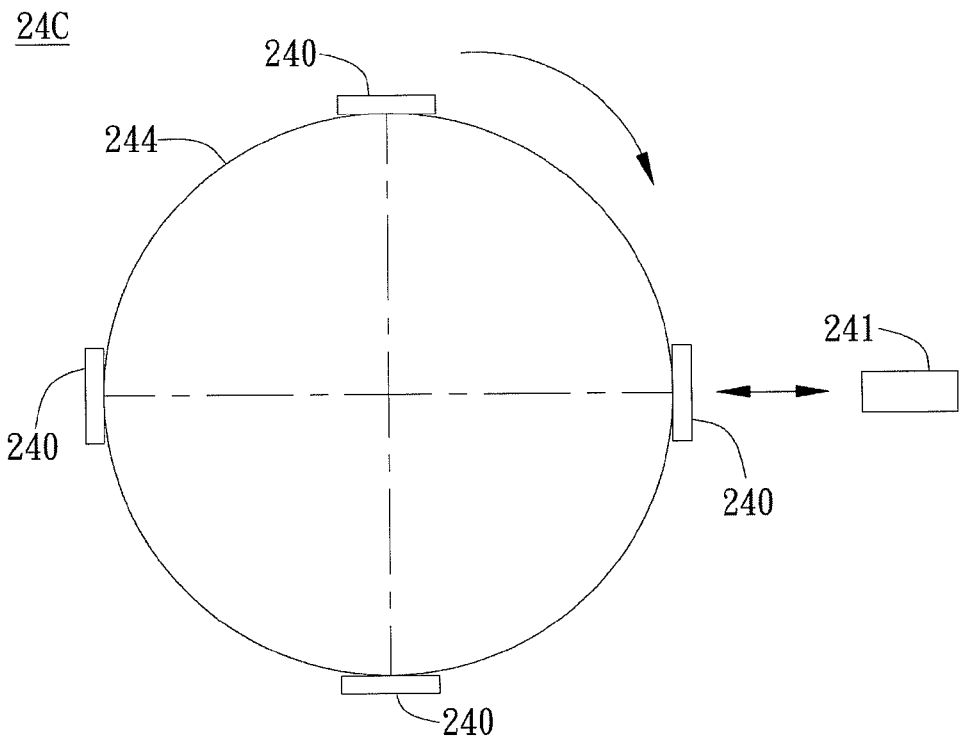
Figure 4B:
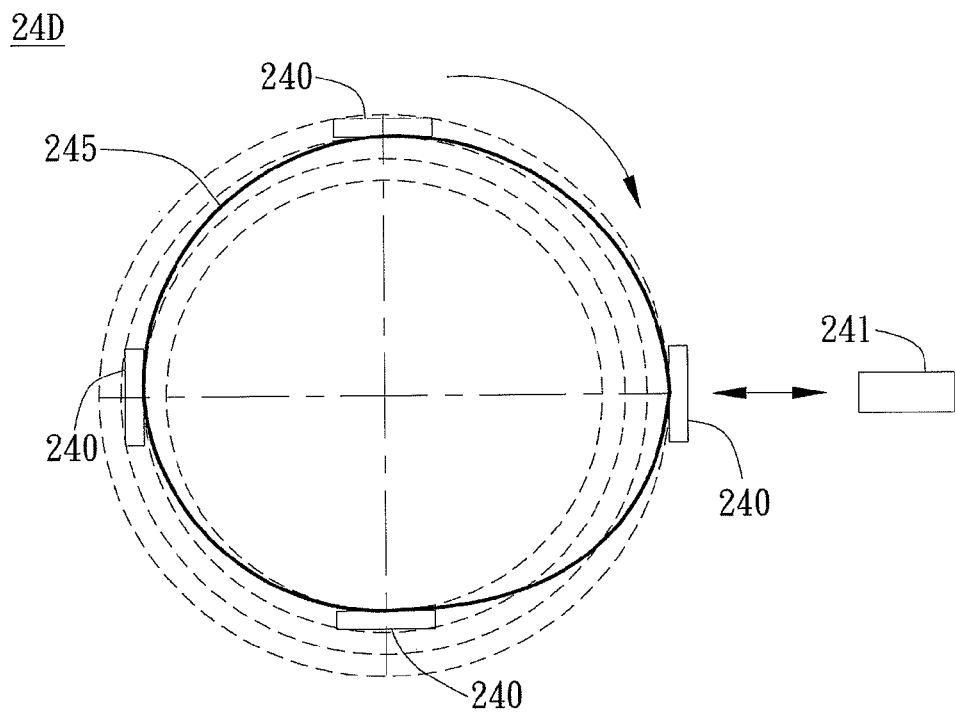
Figure 4C:
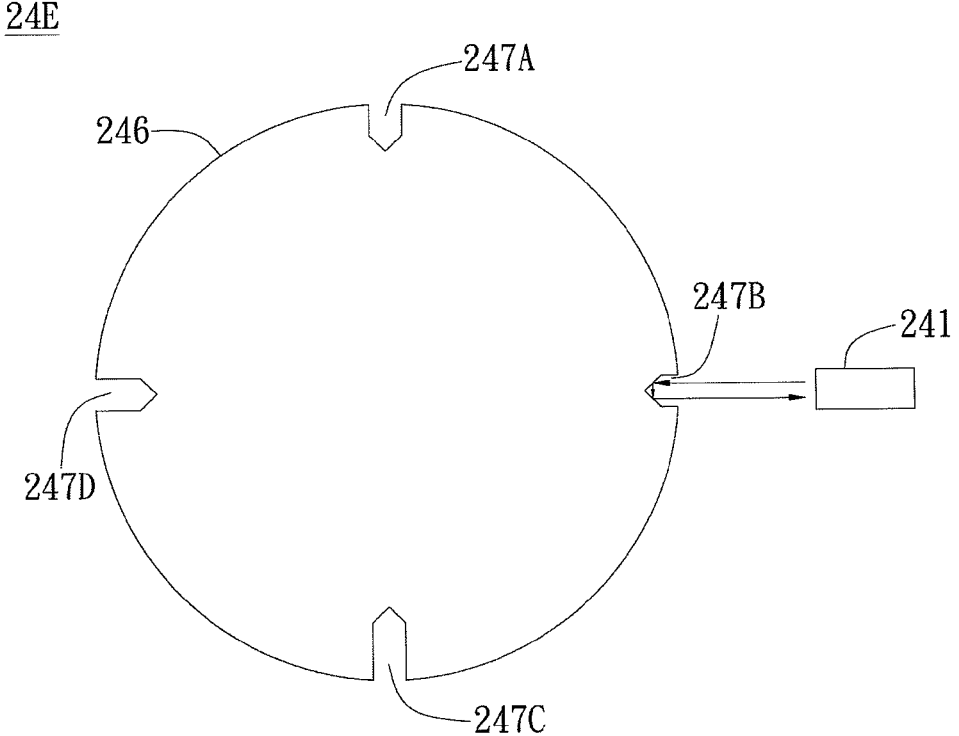

FIG. 4A, FIG. 4B, and FIG. 4C illustrate schematic diagrams of three different integral rotary designed reference light reflection modules.

Figure 5:
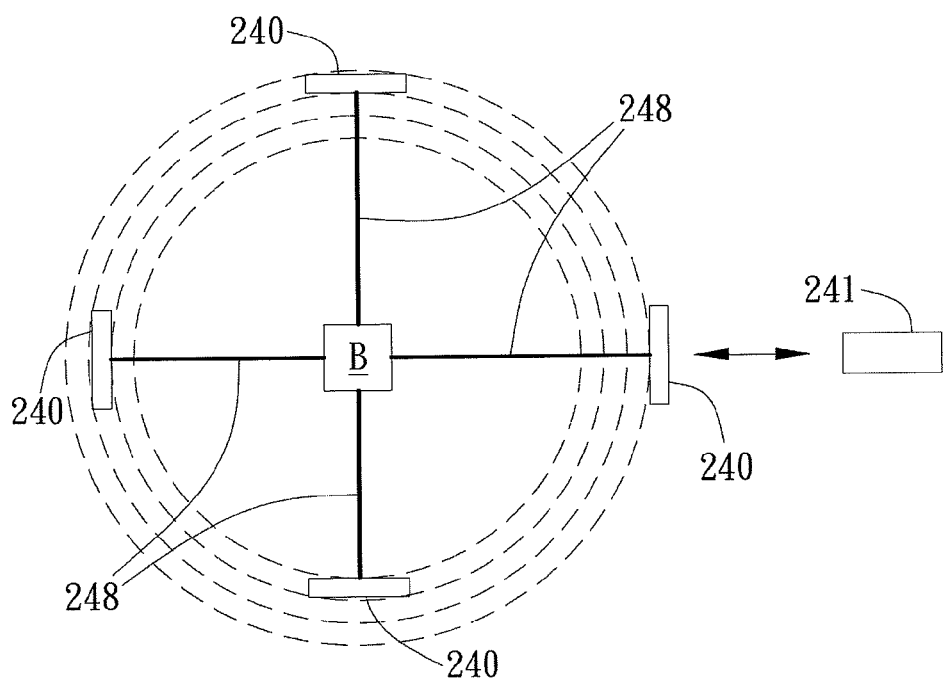

FIG. 5 illustrates a schematic diagram of the modular rotary designed reference light reflection module.

Figure 6A:
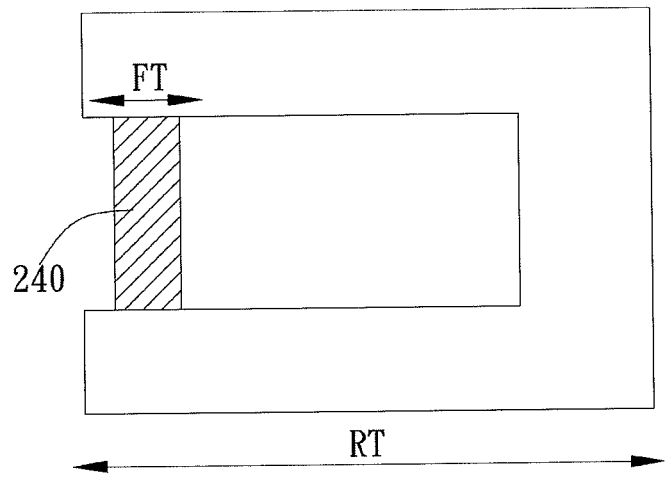

FIG. 6A illustrates a schematic diagram of the reference light reflection module using the horizontal moving mechanism to roughly and narrowly adjust the position of the reflection unit respectively.

Figure 6B:
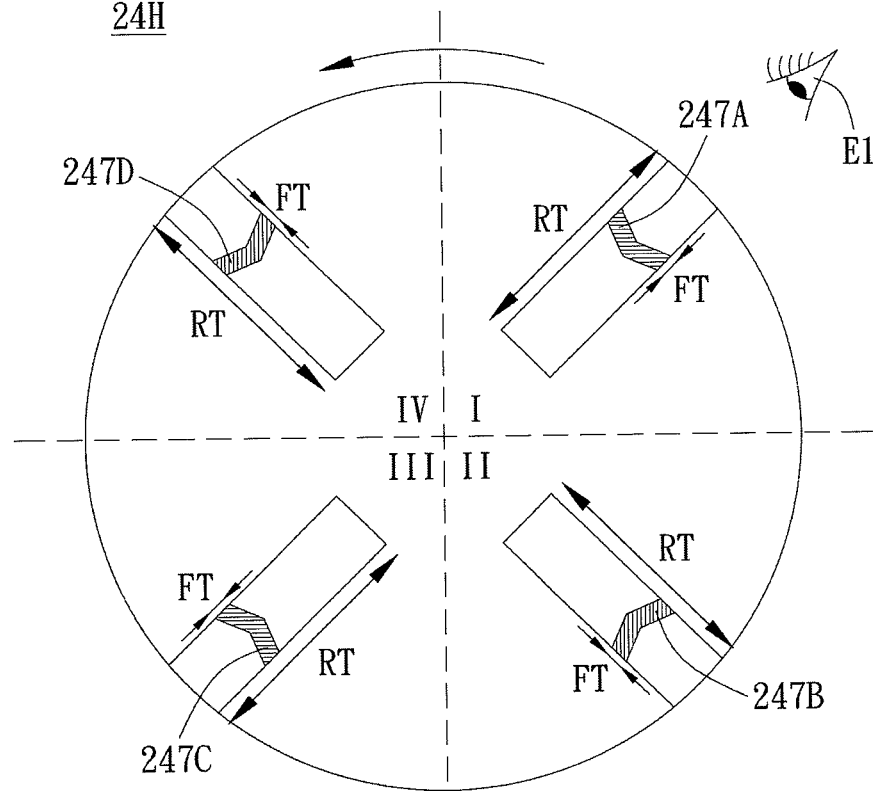

FIG. 6B illustrates a schematic diagram of the reference light reflection module using the rotational mechanism to perform detection on a single person.

Figure 6C:
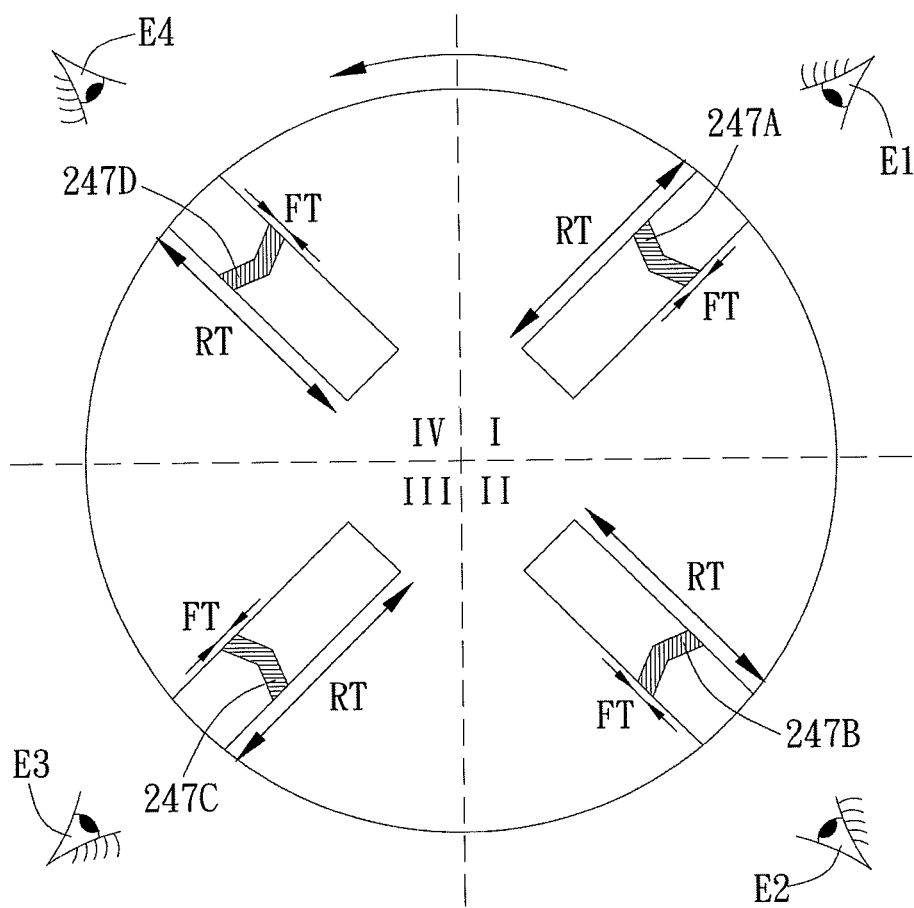

FIG. 6C illustrates a schematic diagram of the reference light reflection module using the rotational mechanism to perform detections on multiple persons at the same time.

Figure 7:
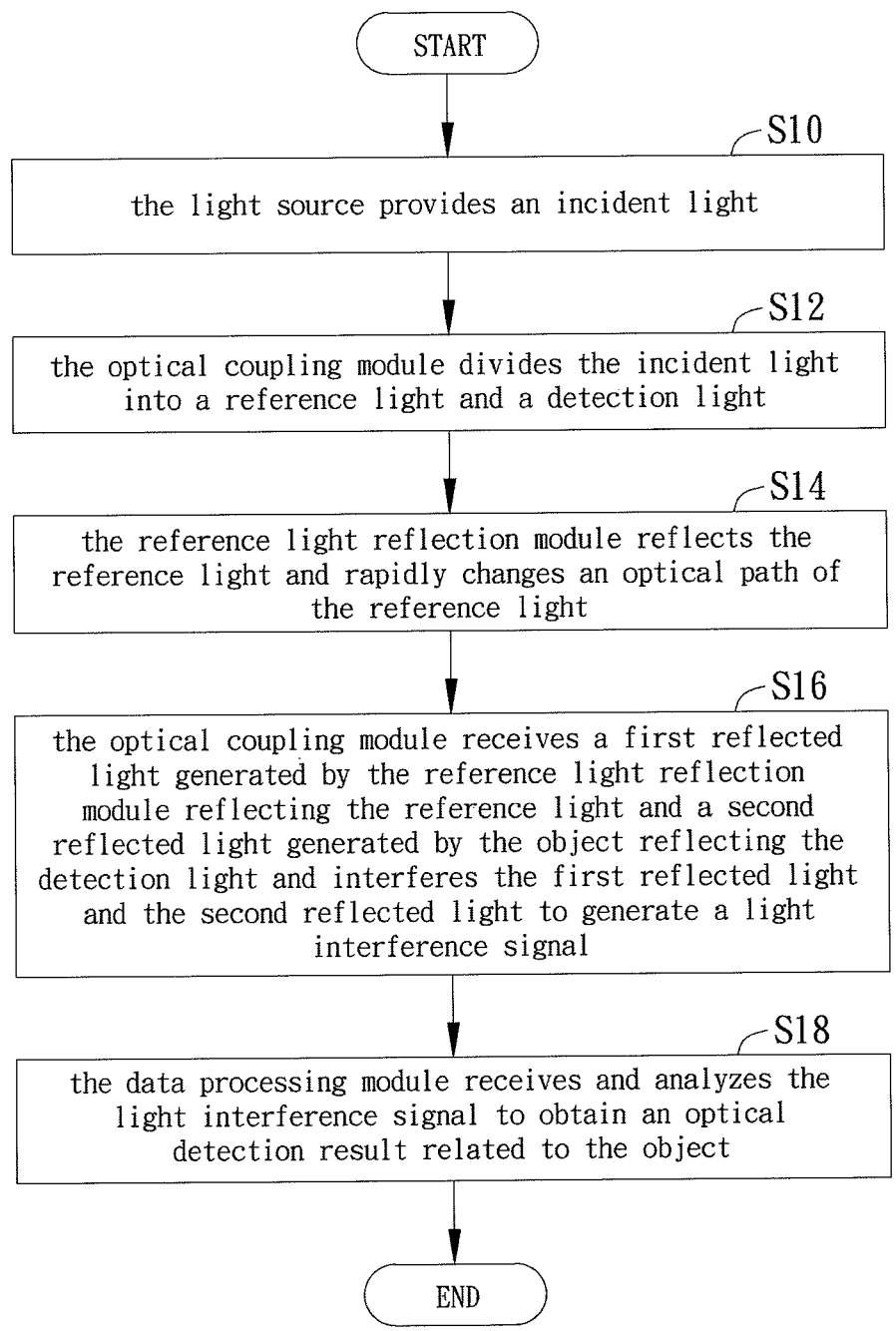

FIG. 7 illustrates a flowchart of the optical apparatus operating method in another embodiment of the invention.

DETAILED DESCRIPTION OF THE INVENTION

A preferred embodiment of the invention is an optical apparatus. In this embodiment, the optical apparatus can be an optical image detection apparatus, but not limited to this. In fact, the optical apparatus can be an optical coherence tomography scanner or other similar equipments without specific limitations.

Figure 1:
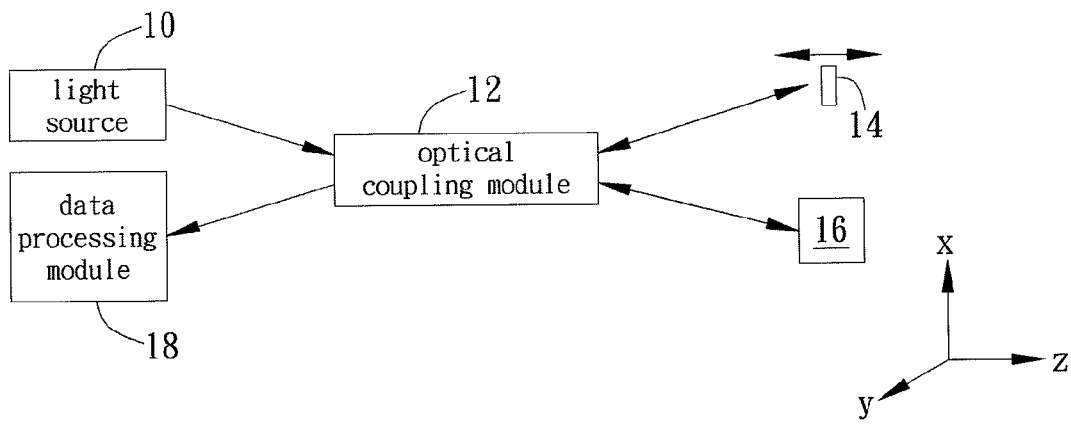
FIG. 1 illustrates a schematic diagram of the basic structure of the conventional optical interference detection apparatus.
Figure 2:
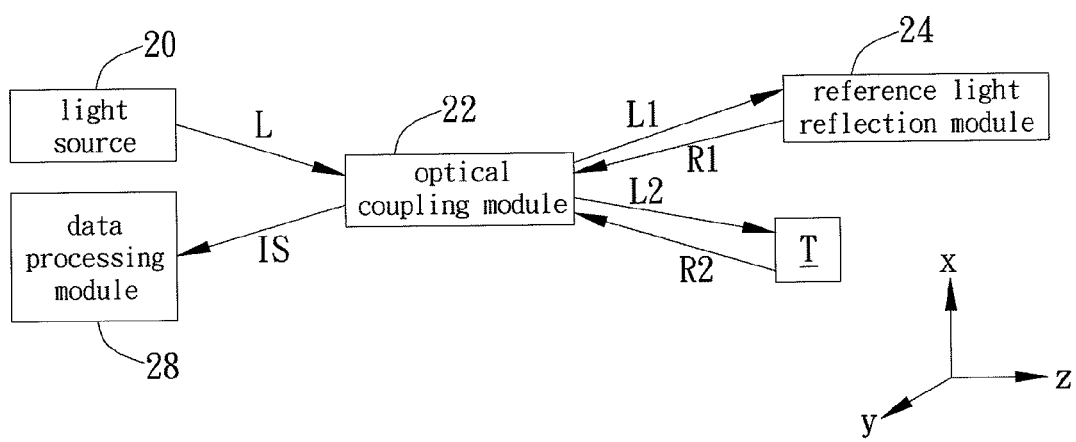
FIG. 2 illustrates a function block diagram of the optical apparatus in an embodiment of the invention.

Please refer to FIG. 2. FIG. 2 illustrates a function block diagram of the optical apparatus in this embodiment. As shown in FIG. 2, the optical apparatus 2 is used to perform optical detection on the object T through optical interference technology. The optical apparatus 2 includes a light source 20, an optical coupling module 22, a reference light reflection module 24, and a data processing module 28. Wherein, the data processing module 28 is coupled to the optical coupling module 22.

In this embodiment, the light source 20 is used to provide an incident light L and the incident light L is emitted to the optical coupling module 22. When the optical coupling module 22 receives the incident light L, the optical coupling module 22 will divide the incident light L into a reference light L1 and a detection light L2, and emit the reference light L1 and the detection light L2 to the reference light reflection module 24 and the object T respectively.

When the reference light L1 is emitted to the reference light reflection module 24, the reference light reflection module 24 will reflect the reference light L1 and use its special design to rapidly change the optical path of the reference light L1. In practical applications, the special design of the reference light reflection module 24 used to rapidly change the optical path of the reference light L1 can be a horizontal moving mechanism or a rotational mechanism, but not limited to this. Then, the structures and operating methods of the reference light reflection module using the horizontal moving mechanism and the rotational mechanism will be introduced respectively.

Figure 3A:
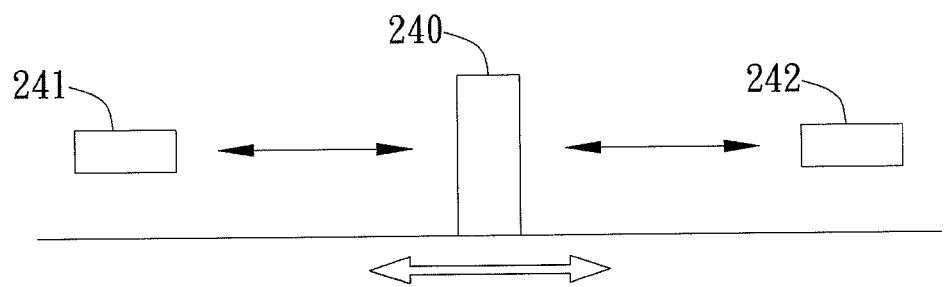
FIG. 3A and FIG. 3B illustrate schematic diagrams of two different reference light reflection modules using the horizontal moving mechanism.
Figure 3B:
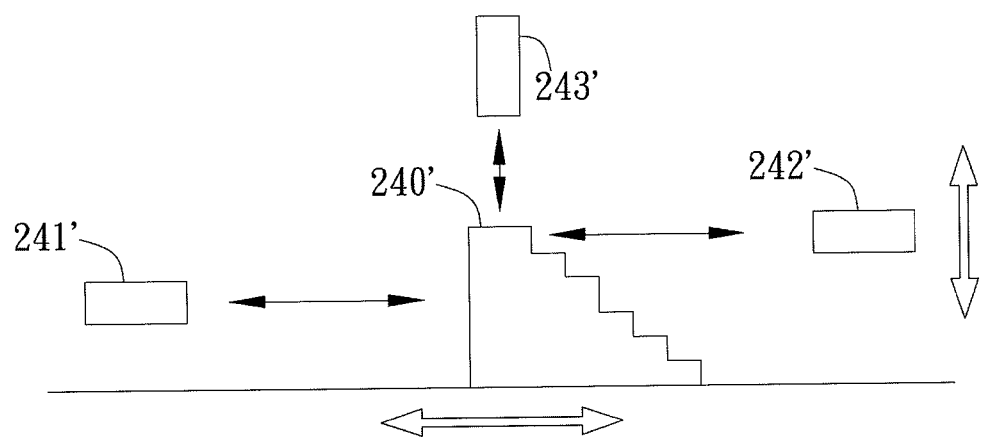

At first, please refer to FIG. 3A and FIG. 3B. FIG. 3A and FIG. 3B illustrate schematic diagrams of two different reference light reflection modules using the horizontal moving mechanism.

As shown in FIG. 3A, the reference light reflection module 24A includes a reflection unit 240 and bi-directional reflection light sources 241~242. Wherein, the reflection light sources 241 and 242 are disposed at two sides of the horizontal direction of the reflection unit 240 respectively, and the reflection unit 240 can move along the horizontal direction. When the reference light reflection module 24A wants to change the optical path of the reference light, the reference light reflection module 24A only needs to control the reflection unit 240 to move along the horizontal direction. Since the reflection light sources 241 and 242 are disposed at two sides of the reflection unit 240, the speed that the reference light reflection module 24A changes the optical path of the reference light can be faster than the speed of the prior art only having a single reflection light source. Therefore, the optical detection efficiency of the optical apparatus 2 can be enhanced. In fact, the reflection light sources 241 and 242 can be also designed to move along the horizontal direction or the vertical direction to increase the degrees of freedom when the reference light reflection module 24A is used.

As shown in FIG. 3B, the reference light reflection module 24B includes a reflection unit 240' in a ladder form and reflection light sources 241'-243'. Wherein, the reflection light sources 241' and 242' are disposed at two sides of the horizontal direction of the reflection unit 240' respectively, and the reflection light source 243' is disposed above the reflection unit 240', and the reflection unit 240' can move along the horizontal direction. It should be noticed that since the reflection unit 240' has the ladder structure facing the reflection light source 242', the reference lights emitted from the reflection light source 242' will be reflected by the ladder structure of the reflection unit 240'. Therefore, when the reference light reflection module 24B wants to change the optical path of the reference light, the reflection module 24B only needs to move the reflection light source 242' along the vertical direction. When the reflection light source 242' is moved along the vertical direction, the reference light emitted from the reflection light source 242' will be emitted to different steps of the ladder structure of the reflection unit 240'. Since the distances between the reflection light source 242' and the different steps are different, the effect of rapidly changing the optical path of the reference light can be achieved accordingly.

Next, the reference light reflection module using the rotational mechanism will be introduced as follows. In practical applications, the reference light reflection module can be integral rotary designed or modular rotary designed. If the reference light reflection module is integral rotary designed, and the rotation element is overall designed and the reflection unit is disposed in an isometric position or a non-isometric position. If the reference light reflection module is modular rotary designed, and the rotation element is disposed on the rotation base and radially outward, the reflection unit is disposed at a far end of the rotation element, the length of the rotation element is adjustable, and the number of the rotation element disposed on the rotation base is adjustable.

Please refer to FIG. 4A, FIG. 4B, and FIG. 4C. FIG. 4A, FIG. 4B, and FIG. 4C illustrate schematic diagrams of three different integral rotary designed reference light reflection modules.

As shown in FIG. 4A, the reference light reflection module 24C includes a rotation element 244, a reflection unit 240, and a reflection light source 241. Wherein, the rotation element 244 is overall designed, and the reflection unit 240 is a reflection mirror disposed in an isometric position. In this embodiment, the rotation element 244 is in circle form, and the reflection units 240 are disposed at different positions on the circumference of the rotation element 244. In the reference light reflection module 24C, the reference lights emitted from the reflection light source 241 can be reflected by the reflection units 240 disposed at different positions on the circumference of the rotation element 244 by rotating the rotation element 244 at different times to achieve the effect of rapidly changing the optical path of the reference light.

As shown in FIG. 4B, the reference light reflection module 24D includes a rotation element 245, a reflection unit 240, and a reflection light source 241. Wherein, the rotation element 245 is overall designed, and the reflection unit 240 is a reflection mirror. The difference between FIG. 4B and FIG. 4A is that the reflection units 240 are not disposed at the same circumference; therefore, although the reflection units 240 are disposed at different positions on the rotation element 245, the rotation element 245 is not in circle form. In the reference light reflection module 24D, the reference lights emitted from the reflection light source 241 can be reflected by the reflection units 240 disposed at different positions on the rotation element 245 by rotating the rotation element 245 at different times to achieve the effect of rapidly changing the optical path of the reference light.

As shown in FIG. 4C, the reference light reflection module 24E includes a rotation element 246, reflection units 247A~247D, and a reflection light source 241. Wherein, the rotation element 246 is overall designed, and the reflection units 247A~247D are disposed in recessed portions of the rotation element 246. It should be noticed that the reflection units 247A~247D are disposed at different positions on the circumference of the rotation element 246, and the reflection units 247A~247D have different depths respectively. In this embodiment, the reflection unit 247C has maximum depth and the reflection unit 247B has minimum depth, but not limited to this. In the reference light reflection module 24E, the reference lights emitted from the reflection light source 241 can be reflected by the reflection units 247A~247D disposed at different positions on the rotation element 246 and having different depths by rotating the rotation element 246 at different times to achieve the effect of rapidly changing the optical path of the reference light.

Please refer to FIG. 5. FIG. 5 illustrates a schematic diagram of the modular rotary designed reference light reflection module. As shown in FIG. 5, the reference light reflection module 24F includes a rotation base B, rotation elements 248, reflection units 240, and a reflection light source 241. The rotation elements 248 are disposed on the rotation base B and radially outward, the reflection units 240 are disposed at a far end of the rotation elements 248. It should be noticed that the length of the rotation element 248 is adjustable, and the number of the rotation element 248 disposed on the rotation base B is also adjustable. In the reference light reflection module 24F, the reference lights emitted from the reflection light source 241 can be reflected by the reflection units 240 disposed at the far ends of the rotation elements 248 having different lengths at different times to achieve the effect of rapidly changing the optical path of the reference light.

In fact, the reference light reflection module of the invention can also roughly or narrowly adjust the position of the reflection unit respectively. For example, the reference light reflection module can have a main adjusting mechanism used for roughly adjusting the position of the reflection unit and a narrow adjusting mechanism used for narrowly adjusting the position of the reflection unit, but not limited to this.

Please refer to FIG. 6A. FIG. 6A illustrates a schematic diagram of the reference light reflection module using the horizontal moving mechanism to roughly and narrowly adjust the position of the reflection unit respectively. As shown in FIG. 6A, the reference light reflection module 24G can roughly adjust the position of the reflection unit 240 to make the reflection unit 240 to move a longer distance RT; similarly, the reference light reflection module 24G can narrowly adjust the position of the reflection unit 240 to make the reflection unit 240 to move a shorter distance FT. For example, when the optical apparatus 2 is applied to measure human's axial length, the reference light reflection module 24G can roughly or narrowly adjusts the position of the reflection unit 240 respectively according to the factors of race, age, gender, residence area of the person to be detected, so that the accurate data of the axial length can be rapidly obtained for the medical personnel to do the clinical diagnosis. In addition, the steps of the reflection unit 240' in the ladder form can be also regarded as the narrow adjusting mechanism, but not limited to this.

Please refer to FIG. 6B. FIG. 6B illustrates a schematic diagram of the reference light reflection module using the rotational mechanism to perform detection on a single person. As shown in FIG. 6B, the reflection units 247A~247D of the reference light reflection module 24H are disposed in recessed portions on the regions I~IV of the rotation element 246 respectively. When an eye E1 of the single person is detected, if the eye E1 of the single person first faces the region I of the rotation element 246, the reflection unit 247A disposed in the region I will reflect the reference light; when the rotation element 246 counterclockwise rotates ¼ cycle, the eye E1 of the single person will become to face the region II of the rotation element 246, and the reflection unit 247B disposed in the region II will reflect the reference light; when the rotation element 246 counterclockwise rotates ½ cycle, the eye E1 of the single person will become to face the region III of the rotation element 246, and the reflection unit 247C disposed in the region III will reflect the reference light; when the rotation element 246 counterclockwise rotates ¾ cycle, the eye E1 of the single person will become to face the region IV of the rotation element 246, and the reflection unit 247D disposed in the region IV will reflect the reference light. The reference light reflection module 24H can roughly adjust the positions of the reflection unit 247A~247D in the recessed portions on the regions I~IV of the rotation element 246 to make them to move a longer distance RT; similarly, the reference light reflection module 24H can narrowly adjust the positions of the reflection unit 247A~247D in the recessed portions on the regions I~IV of the rotation element 246 to make them to move a shorter distance FT.

Please refer to FIG. 6C. FIG. 6C illustrates a schematic diagram of the reference light reflection module using the rotational mechanism to perform detections on multiple persons at the same time. As shown in FIG. 6C, if the eyes E1~E4 of the four persons first face the regions I~IV of the rotation element 246 respectively, the reflection units 247A~247D disposed in the regions I~IV will reflect the reference lights respectively; when the rotation element 246 counterclockwise rotates ¼ cycle, the eyes E1~E4 of the four persons will become to face the region II, the region III, the region IV, and the region I of the rotation element 246 respectively, the reflection units 247B, 247C, 247D, and 247A disposed in the region II, the region III, the region N, and the region I will reflect the reference lights respectively; when the rotation element 246 counterclockwise rotates ½ cycle, the eyes E1~E4 of the four persons will become to face the region III, the region N, the region I, and the region II of the rotation element 246 respectively, the reflection units 247C, 247D, 247A, and 247B disposed in the region III, the region IV, the region I, and the region II will reflect the reference lights respectively; when the rotation element 246 counterclockwise rotates ¾ cycle, the eyes E1~E4 of the four persons will become to face the region IV, the region I, the region II, and the region III of the rotation element 246 respectively, the reflection units 247D, 247A, 247B, and 247C disposed in the region IV, the region I, the region II, and the region III will reflect the reference lights respectively. By doing so, the detection efficiency of the optical apparatus 2 will be enhanced. In addition, because the reflection units 240 shown in FIG. 5 are disposed at the far ends of the rotation elements 248 respectively, and the rotation elements 248 disposed on the rotation base B can have different lengths based on practical needs, the rotation elements 248 can be regarded as the narrow adjusting mechanism, but not limited to this.

Please back to FIG. 2. When the reference light reflection module 24 uses the above-mentioned designs to reflect the reference light L1 to generate a first reflection light R1 and the object T reflects the detection light L2 to generate a second reflection light R2, the optical coupling module 22 will receive the first reflection light R1 and the second reflection light R2 respectively and interfere the first reflected light R1 and the second reflected light R2 to generate the light interference signal IS. Then, the data processing module 28 receives and analyzes the light interference signal IS to obtain an optical detection result related to the object T. In practical applications, the optical detection result related to the object T can use the optical coherence tomography (OCT) technology to perform detection on the object T and interference comparison to the detection signal to determine the matter characteristics of the object T in depth direction, but not limited to this.

Another embodiment of the invention is an optical apparatus operating method. In this embodiment, the optical apparatus includes a light source, an optical coupling module, a reference light reflection module, and a data processing module. Please refer to FIG. 7. FIG. 7 illustrates a flowchart of the optical apparatus operating method in another embodiment of the invention.

As shown in FIG. 7, in step S10, the light source provides an incident light. Then, in step S12, the optical coupling module divides the incident light into a reference light and a detection light and the reference light is emitted to the reference light reflection module and the detection light is emitted to an object to be detected. In step S14, the reference light reflection module reflects the reference light and rapidly changes an optical path of the reference light. Afterward, in step S16, the optical coupling module receives a first reflected light generated by the reference light reflection module reflecting the reference light and a second reflected light generated by the object reflecting the detection light and the optical coupling module interferes the first reflected light and the second reflected light to generate a light interference signal. At last, in step S18, the data processing module receives and analyzes the light interference signal to obtain an optical detection result related to the object.

In practical applications, the reference light reflection module uses a horizontal moving mechanism or a rotational mechanism to rapidly change the optical path of the reference light.

If the reference light reflection module uses the horizontal moving mechanism, the reference light reflection module includes a reflection unit in a ladder form and a bi-directional reflection light source. The reference light reflection module roughly or narrowly adjusts the position of the reflection unit respectively.

If the reference light reflection module uses the rotational mechanism, the reference light reflection module is integral rotary designed or modular rotary designed. The reference light reflection module roughly or narrowly adjusts the position of the reflection unit respectively.

Compared with the prior art, the optical apparatus and operating method thereof in the invention enhance the speed of changing the optical path of the reference light by a reference light reflection module using a horizontal moving mechanism or a rotational mechanism to increase the optical detection efficiency of the optical apparatus using non-destructive and non-contact optical interference technology. In addition, if the reference light reflection module is modular rotary designed, the length of the rotation element is adjustable, and the number of the rotation element disposed on the rotation base can be also adjusted based on different detection items and objects to be detected, so that the elastic that the optical device performs optical detection can be effectively enhanced. Moreover, when the optical apparatus of the invention is applied to measure human's axial length, the reference light reflection module can roughly or narrowly adjusts the position of the reflection unit respectively according to the factors of race, age, gender, residence area of the person to be detected, so that the accurate data of the axial length can be rapidly obtained for the medical personnel to do the clinical diagnosis.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical apparatus, comprising:
a light source, for providing an incident light;
an optical coupling module, for dividing the incident light into a reference light and a detection light, wherein the detection light is emitted to an object to be detected;
a reference light reflection module, for reflecting the reference light from the optical coupling module and rapidly changing an optical path of the reference light by a rotational mechanism;
wherein, the optical coupling module also receives a first reflected light generated by the reference light reflection module reflecting the reference light and a second reflected light generated by the object reflecting the detection light and the optical coupling module interferes the first reflected light and the second reflected light to generate a light interference signal; and
a data processing module, for receiving and analyzing the light interference signal to obtain an optical detection result related to the object;
wherein, the reference light reflection module at least comprises a rotation base, a rotation element, reflection units, and a reflection light source, the rotation base itself can rotate and have multiple degrees of freedom, the reflection units are disposed at different positions on a circumference of the rotation element, and the reflection units have different depths respectively.

2. The optical apparatus of claim 1, wherein the reference light reflection module roughly or narrowly adjusts the position of the reflection unit respectively.

3. A method of operating an optical apparatus, the optical apparatus comprising a light source, an optical coupling module, a reference light reflection module, and a data processing module, the method comprising steps of:
   (a) the light source providing an incident light;
   (b) the optical coupling module dividing the incident light into a reference light and a detection light, wherein the reference light is emitted to the reference light reflection module and the detection light is emitted to an object to be detected;
   (c) the reference light reflection module reflecting the reference light and rapidly changing an optical path of the reference light by a rotational mechanism;
   (d) the optical coupling module receiving a first reflected light generated by the reference light reflection module reflecting the reference light and a second reflected light generated by the object reflecting the detection light and the optical coupling module interfering the first reflected light and the second reflected light to generate a light interference signal; and
   (e) the data processing module receiving and analyzing the light interference signal to obtain an optical detection result related to the object;
   wherein, the reference light reflection module at least comprises a rotation base, a rotation element, reflection units, and a reflection light source, the rotation base itself can rotate and have multiple degrees of freedom, the reflection units are disposed at different positions on a circumference of the rotation element, and the reflection units have different depths respectively.

4. The method of claim 3, wherein the reference light reflection module roughly or narrowly adjusts the position of the reflection unit respectively.

* * * * *